(12) United States Patent
Haniya et al.

(10) Patent No.: US 8,413,538 B2
(45) Date of Patent: Apr. 9, 2013

(54) ARTICULATED MANIPULATOR

(75) Inventors: Kazuhiro Haniya, Kitakyushu (JP);
Manabu Okahisa, Kitakyushu (JP);
Atsushi Ichibangase, Kitakyushu (JP)

(73) Assignee: Kabushiki Kaisha Yaskawa Denki,
Kitakyushu-Shi (JP)

( * ) Notice: Subject to any disclaimer, the term of this patent is extended or adjusted under 35 U.S.C. 154(b) by 0 days.

(21) Appl. No.: 13/115,992

(22) Filed: May 26, 2011

(65) Prior Publication Data

US 2011/0219906 A1    Sep. 15, 2011

Related U.S. Application Data

(63) Continuation of application No. 12/088,283, filed as application No. PCT/JP2006/318284 on Sep. 14, 2006, now Pat. No. 7,971,504.

(30) Foreign Application Priority Data

Sep. 27, 2005 (JP) ................................. 2005-279133

(51) Int. Cl.
*B25J 18/02* (2006.01)
(52) U.S. Cl.
USPC ....................................................... 74/490.03
(58) Field of Classification Search ............... 74/490.01, 74/490.02, 490.03, 490.06; 414/918; 901/23, 901/24, 50
See application file for complete search history.

(56) References Cited

U.S. PATENT DOCUMENTS

| 4,828,453 | A |   | 5/1989 | Martin et al. |
| 5,201,239 | A |   | 4/1993 | Bundo et al. |
| 5,293,107 | A |   | 3/1994 | Akeel |
| 5,303,333 | A |   | 4/1994 | Hoos |
| 5,375,480 | A | * | 12/1994 | Nihei et al. ................. 74/490.02 |
| 5,428,713 | A |   | 6/1995 | Matsumaru |

(Continued)

FOREIGN PATENT DOCUMENTS

| DE | 2228598 | 1/1974 |
| DE | 4244379 | 6/1994 |

(Continued)

OTHER PUBLICATIONS

Japanese Office Action for corresponding JP Application No. 2007-537576, Nov. 4, 2011.

(Continued)

*Primary Examiner* — Vicky Johnson
(74) *Attorney, Agent, or Firm* — Ditthavong Mori & Steiner, P.C.

(57) ABSTRACT

An articulated manipulator includes a base body, a first arm body, a second arm body having a second arm center axis, and a third arm body. A first joint part connects the base body and a first end portion of the first arm body rotatably around a first rotation axis. A second joint part connects a second end portion of the first arm body and a third end portion of the second arm body rotatably around a second rotation axis. A third joint part connects a fourth end portion of the second arm body and a fifth end portion of the third arm body rotatably around the third rotation axis. When the first, second and third arm bodies are all erected with respect to a installation surface, the first rotation axis, the second arm center axis, and the third rotation axis are substantially aligned with each other.

13 Claims, 4 Drawing Sheets

U.S. PATENT DOCUMENTS

| | | | |
|---|---|---|---|
| 5,523,662 A | 6/1996 | Goldenberg et al. | |
| 6,014,909 A * | 1/2000 | Fiora | 74/490.02 |
| 6,125,715 A | 10/2000 | Nissfolk et al. | |
| 6,250,174 B1 | 6/2001 | Terada et al. | |
| 6,817,553 B2 | 11/2004 | Steur | |
| 6,922,610 B2 | 7/2005 | Okamoto et al. | |
| 2002/0148320 A1 | 10/2002 | Kimata et al. | |
| 2003/0010148 A1 | 1/2003 | Okamoto et al. | |
| 2003/0200831 A1 * | 10/2003 | Matsumoto et al. | 74/490.06 |
| 2004/0138779 A1 | 7/2004 | Shibata et al. | |
| 2004/0149064 A1 | 8/2004 | Narita et al. | |
| 2009/0114052 A1 * | 5/2009 | Haniya et al. | 74/490.03 |

FOREIGN PATENT DOCUMENTS

| | | |
|---|---|---|
| DE | 19509050 | 9/1996 |
| EP | 0136719 | 4/1985 |
| JP | 61-244475 | 10/1986 |
| JP | 62-277285 | 12/1987 |
| JP | 63-17790 | 1/1988 |
| JP | 1-127939 | 5/1989 |
| JP | 07-069266 B2 | 5/1989 |
| JP | 02-298482 | 12/1990 |
| JP | 06-079685 | 3/1994 |
| JP | 06-143186 | 5/1994 |
| JP | 10-166292 | 6/1998 |
| JP | 10-225881 | 8/1998 |
| JP | 10-329079 | 12/1998 |
| JP | 11-129183 | 5/1999 |
| JP | 2000-141253 | 5/2000 |
| JP | 2001-113488 | 4/2001 |
| JP | 2002-307365 | 10/2002 |
| JP | 2003-025269 | 1/2003 |
| JP | 2003-025270 | 1/2003 |
| JP | 2004-148449 | 5/2004 |
| JP | 102004002416 | 10/2004 |
| JP | 2005-014103 | 1/2005 |
| JP | 2005-14108 | 1/2005 |
| JP | 2005-46966 | 2/2005 |
| JP | 2005-0081499 | 3/2005 |
| JP | 2005-177904 | 7/2005 |
| WO | 99/01261 | 1/1999 |
| WO | 01/51259 | 7/2001 |

OTHER PUBLICATIONS

European Office Action for corresponding EP Application No. 09007695.1, Sep. 3, 2010.

Chinese Office Action for corresponding CN Application No. 200680035659.4, Jun. 21, 2010.

European Serch Report for corresponding EP Application No. 09007695.1, Dec. 16, 2009.

European Serch Report for corresponding EP Application No. 09007695.1, Aug. 28, 2009.

European Serch Report for corresponding EP Application No. 09007695.1, Oct. 20, 2008.

Zinn et al., Playing it safe, IEEE Robotics and Automation Magazine, Jun. 2004, vol. 11, Issue 2, pp. 12-21.

Robo industrial da show de design e tecnologia, INOVACAO tecnologica, Aug. 19, 2005, URL: http://www.inovacaotecnologica.com/br/noticias/noticia.php?artigo=010180050819.

Bischoff et al., The KUKA-DLR Lightweight Robot arm—a new reference platform for robotics research and manufacturing, Proceeding of Robotics (ISR), 2010 41st International Symposium on and 2010 6th German Conference on Robotics (ROBOTIK), Jun. 7, 2010.

Japanese Office Action for corresponding JP Application No. 2011-283819, Jan. 22, 2013.

Korean Office Action for corresponding KR Application No. 10-2008-7007992, Jan. 24, 2013.

* cited by examiner

BACKGROUND ART

FIG. 5

BACKGROUND ART

FIG. 6

ARTICULATED MANIPULATOR

CROSS-REFERENCE TO RELATED APPLICATIONS

The present application is a continuation application of the U.S. patent application Ser. No. 12/088,283 filed Mar. 27, 2008, which in turn is a national stage application of International Application No. PCT/JP2006/318284, filed Sep. 14, 2006, which claims priority to Japanese Patent Application No. 2005-279133, filed Sep. 27, 2005. The contents of these applications are incorporated herein by reference in their entirety.

BACKGROUND OF THE INVENTION

1. Field of the Invention

The present invention relates to an articulated manipulator.

2. Discussion of the Background

An oblique joint of a conventional erectable manipulator can be folded up, and the manipulator can be disposed even in a narrow space. In order to realize a hollow oblique joint, a hollow harmonic drive reduction gear mechanism is provided (see JP-A-2004-148449). Further, in order to drive the oblique joint, the power of a rotary axis of a motor to the speed-reduction mechanism is transmitted by a spur gear in a case where the rotation axis is parallel to the rotation axis of a joint, and is transmitted by a bevel gear in the case of inclination (see JP-A-2003-025269).

Figure 4:
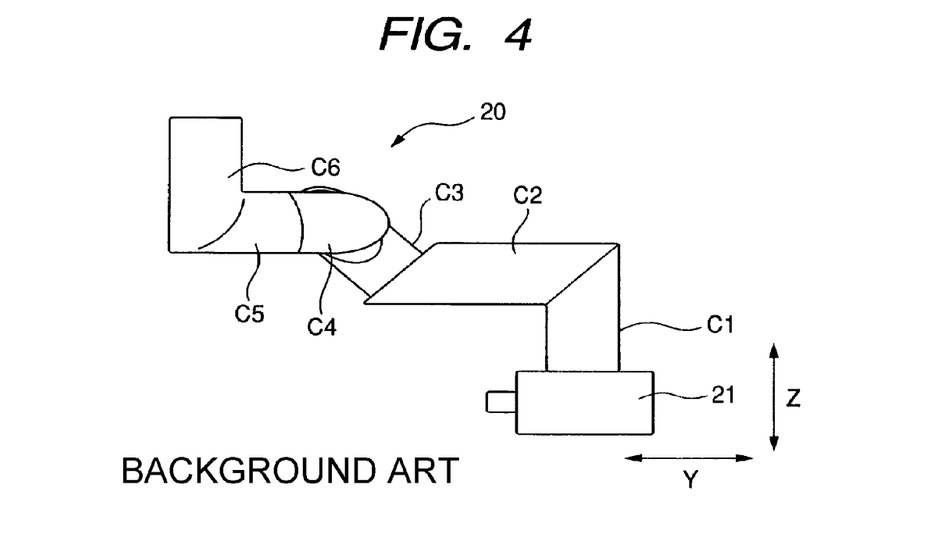
FIG. 4 is an external view of a conventional manipulator apparatus.
Figure 5:
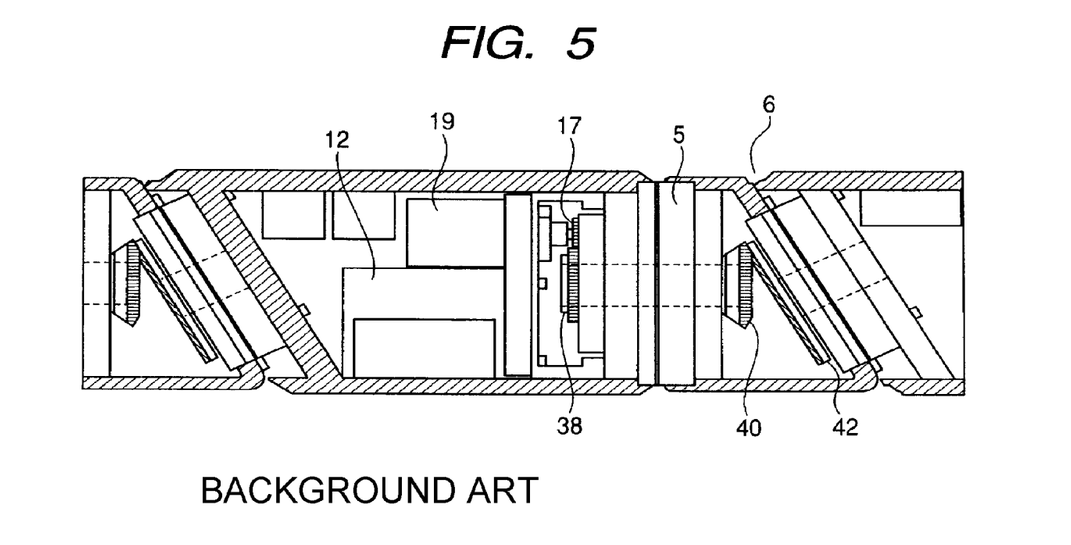
FIG. 5 is a side sectional view of joint parts of the conventional manipulator apparatus.

FIG. 4 is a view showing a manipulator of Patent Document 1. In FIG. 4, 20 is an articulated manipulator, C1 is a first arm body, C2 is a second arm body, C3 is a third arm body, C4 is a fourth arm body, C5 is a fifth arm body, and C6 is a sixth arm body. The arm bodies are connected together so as to be rotatable around the rotation axes tilted at 45 degrees. In the articulated manipulator 20, the position and posture of a hand apparatus that are provided at the sixth arm body C6 (not shown) can be changed by rotating the arm bodies C1 to C6, respectively. Further, the first arm body C1 and the second arm body C2, the second arm body C2 and the third arm body C3, the third arm body C3 and the fourth arm body C4, and the fifth arm body C5 and the sixth arm body C6 are bent at 90 degrees with respect to each other. From this posture, if the second arm body C2 is operated with respect to the third arm body C3, and the fourth arm body C4 is operated with respect to the third arm body C3, the position of the sixth arm body C6 can be kept away from the first arm body C1 in the lateral direction Y, and can be made small in the height direction Z. This enables the sixth arm body C6 to be moved in the lateral direction Y in a state where the posture of the sixth arm body C6 is maintained, and the distance in the longitudinal direction Z between the sixth arm body C6 and a base 21 is short. As such, the oblique joint of the conventional manipulator can be folded up, and the manipulator can be disposed even in a narrow space. Further, FIG. 5 is a view showing a joint mechanism of a robot according to Patent Document 2. In FIG. 5, the rotation of a motor 12 drives an oblique joint 6 via bevel gears 40 and 42. As such, the oblique joint of the conventional manipulator drives joints via a gear device.

SUMMARY OF THE INVENTION

According to one aspect of the present invention, an articulated manipulator includes a base body, a first arm body, a first joint part, a second arm body, a second joint part, a third arm body, and a third joint part. The base body is to be mounted on an installation surface where the articulated manipulator is installed. The first arm body has a first end portion, a second end portion opposite to the first end portion, and a first rotation axis that is a center axis of the first end portion. The first joint part connects the base body and the first end portion of the first arm body rotatably around the first rotation axis. The second arm body has a third end portion, a fourth end portion opposite to the third end portion, and a second arm center axis. The second joint part connects the second end portion of the first arm body and the third end portion of the second arm body rotatably around a second rotation axis that is substantially perpendicular to the first rotation axis. The second end portion of the first arm body is connected to one side of the second joint part. The third end portion of the second arm body is connected to another side of the second joint part opposite to the one side. The third arm body has a fifth end portion, a sixth end portion opposite to the fifth end portion, and a third rotation axis. The third joint part connects the fourth end portion of the second arm body and the fifth end portion of the third arm body rotatably around the third rotation axis that is substantially perpendicular to the second rotation axis and that is aligned with the second arm center axis. When the first, second and third arm bodies are all erected with respect to the installation surface, the first rotation axis, the second arm center axis, and the third rotation axis are substantially aligned with each other.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Hereinafter, embodiments of the invention will be described with reference to the drawings.

Embodiment 1

Figure 1:
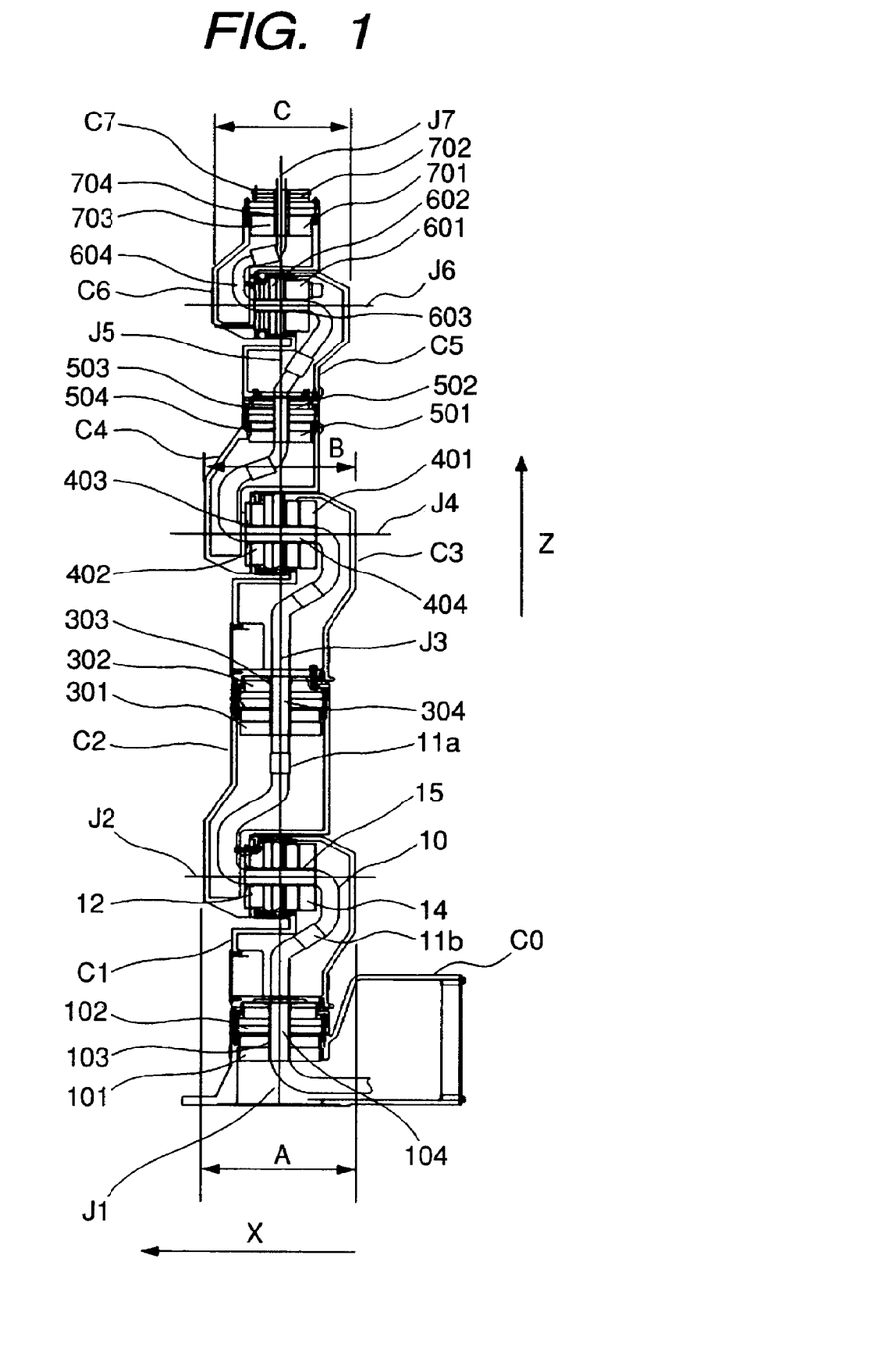
FIG. 1 is a sectional side view of a manipulator apparatus according to a first embodiment of the invention.

FIG. 1 is a sectional side view of a manipulator apparatus showing a first embodiment of the invention. In FIG. 1, C1 is a first arm body, C2 is a second arm body, C3 is a third arm body, C4 is a fourth arm body, C5 is a fifth arm body, and C6 is a sixth arm body. C7 is a seventh arm body. C0 is a base body that supports the first arm body C1, and is a portion that fixes a manipulator apparatus to an installation surface that is not shown. The respective arm bodies rotate relatively by joint parts as will be described later. FIG. 1 shows an erected state in which the base body C0 is installed on a floor surface, and the longitudinal direction of each of the above arm bodies is directed to top and bottom directions. Further, a panel (not shown) that relays linear bodies from servo motors or end effectors to be described later is installed on the base body C0.

Moreover, controllers and their linear bodies of the manipulator apparatus that is not shown similarly are connected via the panel by cables (not shown), and the operation of the servo motors or the end effectors in the manipulator apparatus is controlled. The manipulator apparatus and controllers that are connected in this way are constituted as a robot system.

The first arm C1 rotates about a joint axis J1, the second arm C2 rotates about a joint axis J2, the third arm C3 rotates about a joint axis J3, the fourth arm C4 rotates about a joint axis J4, the fifth arm C5 rotates about a joint axis J5, the sixth arm C6 rotates about a joint axis J6, and the seventh arm C7 rotates about a joint axis J7. In addition, the seventh arm C7 is also a member that connects end effectors to be described later.

Also, the joint axis J2 is orthogonal to the joint axis J1, the joint axis J3 is orthogonal to the joint axis J2, the joint axis J4 is orthogonal to the joint axis J3, the joint axis J5 is orthogonal to the joint axis J4, the joint axis J6 is orthogonal to the joint axis J5, and the joint axis J7 is orthogonal to the joint axis J6. According to the present axis configuration, since a motion orthogonal to an axis that supports a motion axis is obtained, efficient teaching that is close to the same teaching manipulation method as a conventional general six-axis industrial robot is allowed.

Further, in this embodiment, the centers of rotation of the joint axis J1, the joint axis J3, the joint axis J5, and the joint axis J7 are configured so as to be on the same line when the manipulator is erected. According to the present axis configuration, minimum dimensions are taken in order to install the manipulator in a narrow space. That is, the projected area from a top view of the manipulator is minimized. However, it is also possible to give offset dimensions to the centers of rotation of the joint axis J1, the joint axis J3, the joint axis J5, and the joint axis J7.

The joint axis J1 is driven by a reducer 102 that reduces the rotation speed of a servo motor 101, and the centers of rotation of the servo motor 101 and the reducer 102 coincide with the rotation axis of the joint axis J1. Further, a hollow hole 103 is formed in the centers of rotation of the servo motor 101 and the reducer 102, and a linear body 104 is disposed so as to pass through the hollow hole 103.

The joint axis J2 is driven by a reducer 12 that reduces the rotation speed of a servo motor 14, and the centers of rotation of the servo motor 14 and the reducer 12 coincide with the rotation axis of the joint axis J2. Further, a hollow hole 15 is formed in the centers of rotation of the servo motor 14 and the reducer 12, and a linear body 10 is disposed so as to pass through the hollow hole 15.

The joint axis J3 is driven by a reducer 302 that reduces the rotation speed of a servo motor 301, and the centers of rotation of the servo motor 301 and the reducer 302 coincide with the rotation axis of the joint axis J3. Further, a hollow hole 303 is formed in the centers of rotation of the servo motor 301 and the reducer 302, and a linear body 304 is disposed so as to pass through the hollow hole 303.

The joint axis J4 is driven by a reducer 402 that reduces the rotation speed of a servo motor 401, and the centers of rotation of the servo motor 401 and the reducer 402 coincide with the rotation axis of the joint axis J4. Further, a hollow hole 403 is formed in the centers of rotation of the servo motor 401 and the reducer 402, and a linear body 404 is disposed so as to pass through the hollow hole 403.

The joint axis J5 is driven by a reducer 502 that reduces the rotation speed of a servo motor 501, and the centers of rotation of the servo motor 501 and the reducer 502 coincide with the rotation axis of the joint axis J5. Further, a hollow hole 503 is formed in the centers of rotation of the servo motor 501 and the reducer 502, and a linear body 504 is disposed so as to pass through the hollow hole 503.

The joint axis J6 is driven by a reducer 602 that reduces the rotation speed of a servo motor 601, and the centers of rotation of the servo motor 601 and the reducer 602 coincide with the rotation axis of the joint axis J6. Further, a hollow hole 603 is formed in the centers of rotation of the servo motor 601 and the reducer 602, and a linear body 604 is disposed so as to pass through the hollow hole 603.

The joint axis J7 is driven by a reducer 702 that reduces the rotation speed of a servo motor 701, and the centers of rotation of the servo motor 701 and the reducer 702 coincide with the rotation axis of the joint axis J7. Further, a hollow hole 703 is formed in the centers of rotation of the servo motor 701 and the reducer 702, and a linear body 704 is disposed so as to pass through the hollow hole 703.

Each of the linear bodies includes signal lines, such as a power line and an encoder, of each of the servo motors. Particularly, the linear body 704 is a linear body composed of a power line, a signal line, a tube mainly involving fluid, such as air, for an end effector.

As described above, in this manipulator apparatus, the servo motor 101 and the reducer 102 that drive the axis J1 are installed in the base body C0, and one end of the first arm body C1 is connected to and rotated by an output shaft of the reducer 102. The servo motor 14 and the reducer 12 are installed at the other end of the first arm body, and one end of the second arm body C2 is connected to and rotated by an output shaft of the reducer 12. The servo motor 301 and the reducer 302 are installed at the other end of the second arm body C2, and one end of the third arm body C3 is connected to and rotated by an output shaft of the reducer 302. The servo motor 401 and the reducer 402 are installed at the other end of the third arm body C3, and one end of the fourth arm body C4 is connected to and rotated by an output shaft of the reducer 402. The servo motor 501 and the reducer 502 are installed at the other end of the fourth arm body C4, and one end of the fifth arm body C5 is connected to and rotated by an output shaft of the reducer 502. The servo motor 601 and the reducer 602 are installed at the other end of the fifth arm body C5, and one end of the sixth arm body C6 is connected to and rotated by an output shaft of the reducer 602. The servo motor 701 and the reducer 702 are installed at the other end of the sixth arm body C6, and the seventh arm body C7 to which an end effector (not shown) is to be connected is connected to an output shaft of the reducer 702. The end effector is a means that allows this manipulator apparatus to perform work, for example, a handling hand, a welding torch for Tig welding or arc welding, a gun for spot welding, a coating gun that ejects a fluid coating material, or the like.

A servo motor and a reducer that drive a joint axis are formed integrally so that the rotation axes thereof may become the same, and constitute a flat-type actuator. Of course, although it is not necessary to integrally form these, the fact that the servo motor and the reducer are formed integrally and made flat axially contributes to miniaturization of this articulated manipulator. In this actuator, a harmonic drive gear is used for the reducer. The schematic structure of the reducer and the servo motor is known, and the description thereof is omitted. A structure in which the reducer and the servo motor are integrated is known, and the description thereof is omitted similarly. The actuators that drive the axis J1 to the axis J7 are different from each other in the capacity of motors, but are almost the same in configuration.

Figure 6:
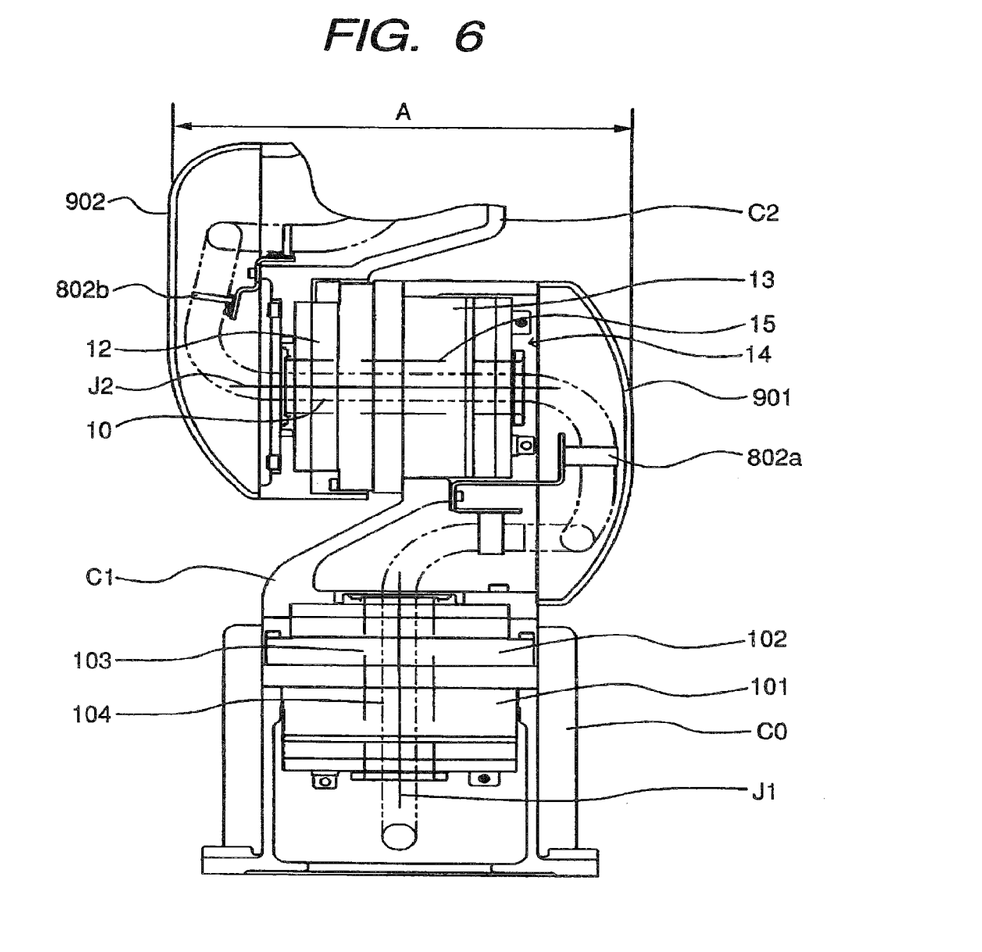
FIG. 6 is a detailed view showing portions of the axes J1 and J2 in FIG. 1 in an enlarged manner.

Particularly, an arrangement of the actuators that constitute the axes J2, J4, and J6 will be explained. Like FIG. 1, these actuators are installed such that each of the axes J1, J3, and J5 passes through almost the middle of the length of each actuator in the direction of the rotation axis thereof. This will be explained with reference to FIG. 6. FIG. 6 is a detailed view showing portions of the axes J1 and J2 in FIG. 1 in an enlarged manner. That is, for example, the actuator is installed such that the axis J1 passes through almost the half position of the length of the actuator composed of the servo motor 14 and the reducer 12 in the axis J2. Thereby, both ends of the hollow hole 15 will be installed in positions almost equal to each other with respect to the axis J1. In the axis J2, the linear body 10 is bent by clamps 802a and 802b so as to draw a circular arc at both ends of the hollow hole 15. Further, in order to obtain this configuration, the arm bodies C1, C3, and C5 have a substantially hollow shape, and the lower end surfaces of the arm bodies are connected to the output shafts of the reducers of the axes (J1, J3, and J5) directly below (directly before) the arm bodies like FIG. 1, the internal spaces of the arm bodies meander so as to be separated from the axes directly below the arm bodies, and receive the bent portions of the linear bodies, and the upper portions of the arm bodies hold the actuators so as to be perpendicular to the axes directly below the arm bodies, and the protruding distances of the actuators and linear bodies of the axes J2, J4, and J6 with respect to the axes directly below the arm bodies are almost the same. On the other hand, although the arm bodies C2, C4, and C6 has almost the same shape as the arm bodies C1, C3, and C5, the arm bodies C2, C4, and C6 are connected in an inverted state. For example, the arm body C2 is connected by the axis J2 in a state of being inverted vertically with respect to the arm body C1. In FIG. 6, reference numeral 13 denotes a J2-axis motor unit.

Accordingly, when the linear bodies 10, 404, and 604 that have passed through the hollow holes of the actuators of the axes J2, J4, and J6 are discharged and bent from both ends of the hollow holes 15, 403, and 603, they protrude at almost the same distance from the axes J1, J3, and J5 at both ends of each hollow hole. Then, the dimension A, dimension B, and dimension C of FIG. 1 showing the outside dimensions in the axes J2, J4, and J6 of the arms formed so as to cover these linear bodies are maintained at almost the same dimension about the axes J1, J3, and J5, respectively. As a result, it is possible to reduce the radius of rotation during rotation to be determined by the dimension A, dimension B, and dimension C when the axes J1, J3, and J5 are rotated, respectively. Further, for example, when the axis J1 is rotated at the time of a pause (at the time of being erected) of an arm like FIG. 1, the minimum radius of rotation determined by the dimension A can be made small. Further, the area to an installation surface at this time also becomes small. Thereby, it is needless to say that the possibility of interference with an apparatus installed around the articulated manipulator is reduced.

Further, in the invention, all the articulations do not have gear mechanisms like Patent Document 2 between a servo motor and a reducer. Thus, even if the motor rotates at high speed, a quiet operation is allowed. Further, since all the axes adopt the flat actuators, the arm widths A, B, and C in the direction of X shown in FIG. 1 can be shortened. It is thus possible to install the manipulation in a narrow space. Further, since it is possible to make the motor of each joint have an outside dimension near the external diameter of a reducer. Thus, it is possible to significantly increase the diameter of a motor magnet and a core. Thus, it is possible to obtain a large-output motor, and it is possible to increase the driving load, speed, and accelerator of an actuator.

A linear body disposed in a hollow hole of each joint is connected by each connector before being in a hollow hole of the adjacent shaft. For example, in the axis J2, both ends of the linear body 10 are respectively connected to the linear body 104 that has passed through the axis J1 and to the linear body 304 that has passed through the axis J3 by connectors 11a and 11b. For this reason, in order to let a large-sized connector pass therethrough, the number of cables that can be disposed in a hollow portion is prevented from being constrained. Of course, in a case where there are few application cables, it is not necessary to perform relay by a connector, and the relay may be performed by an arbitrary joint part. This is because the cables of the axis J2 to the axis J7 passes through the axis J1, and the therefore, the axis J1 has many cables for driving the actuators, but an axis closer to the tip have a higher ratio occupied by the application cables.

Since required cables are disposed in an actuator hollow portion as described above, there is a case of being determined by a required hollow diameter rather than the capacity of a reducer or a motor. In cases other than such a case, it is possible to constitute at least the axes J1 to J3 with harmonic drive gear devices of the same capacity by adopting a light-weight material for an arm, or providing a motion angle limitation. Therefore, it is possible to obtain a manipulator having a small arm profile, and capable of being mounted on a narrow space. In FIGS. 6, 901 and 902 denotes covers connected to the first arm body C1 and the second arm body C2. The third arm body C3 to the sixth arm body C6 have almost the same structure as the covers. Each of the covers is a portion attached to each arm body so as to cover a bent portion of the above linear body. As described above, since one end (lower end) of each arm body is connected to the reducer of the actuator of the shaft directly thereunder, and an actuator for rotating the shaft directly above the arm body is installed at the other end (upper end) of the arm body, each arm body is generally a rigid body. Thus, although each arm body is fabricated of stainless steel, an aluminum alloy, cast iron, or the like, a side portion of the arm body that covers the linear body does not contribute to the strength of the arm body largely. Accordingly, by forming a portion that covers the bent portion of the linear body in the shape of a cover that is a member separate from the arm body, and making the cover of a resin light-weight material, the weight of the arm body is made light, and the power load to the actuator is alleviated. Further, if this cover configuration is adopted, maintenance also improves.

Further, as described above, for example, in the actuators (FIG. 1) of the axes J1 to J3, it is undoubted that the power of an actuator that drive a shaft closer to the axis J1 is required much. However, it is needless to say that the same actuator is desirably used for the respective axes from the viewpoint of management at the time of manufacture of the actuator, or maintenance. Therefore, in the invention, for example, the actuators of the axis J1 and the axis J2, the axis J3 and the axis J4, and the axis J5, the axis J6, and axis J7 have almost the shape, and almost the same capacity. Accordingly, the spacing between the axis J4 and the axis J6 is made wider than the spacing between the axis J2 and the axis J4. Further, by adopting such a configuration, the length of an arm body closer to a tip (end effector side) of the articulated manipulator can be made shorter, and the tip can enter a narrow space.

The articulated manipulator of the invention configured as described above is used for an industrial robot. For example, handing, sealing, painting, or arc welding in a narrow work-space can be performed by connecting various hand apparatuses, i.e., end effectors to a free end of the articulated manipulator, and disposing hand apparatuses in target positions to operate the hand apparatuses.

Further, a so-called double-armed manipulator can be configured by preparing two articulated manipulators of the invention and making their base body C0 common to each other. In this case, the two manipulators may be controlled by one controller so as not to interfere with each other. Further, it is also conceivable that the double-armed manipulator is configured like both arms and body of a human by installing the two manipulators in the common base body C0 similarly to human arms, and accommodating and integrating a controller that controls the manipulators, in the common base body C0. By adopting such configurations in the above work, such as handling, sealing, painting, or arc welding, cooperation work using right and left arms like human arms can be performed.

Figure 3:
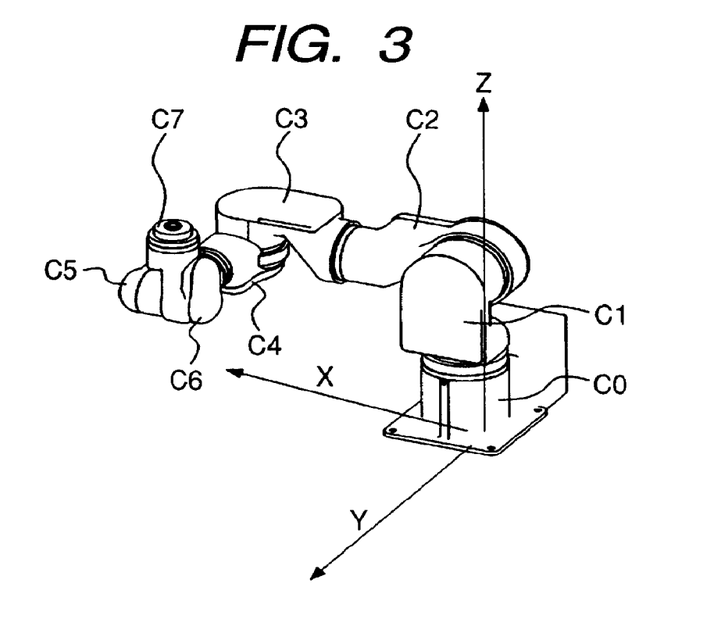
FIG. 3 is a perspective view showing the operation of the manipulator according to an embodiment of the invention.

Further, in the articulated manipulators of the invention, as shown in FIG. 3, the first arm body C1 and the second arm body C2, the second arm body C2 and the third arm body C3, the third arm body C3 and the fourth arm body C4, and the fifth arm body C5 and the sixth arm body C6 are bent at 90 degrees with respect to each other, and if the second arm body C2 is operated in the direction of an obtuse angle with respect to the third arm body C3 from this posture, the position of the sixth arm body C6 can be kept away from the first arm body C1 in the lateral direction Y, and can be made small in the height direction Z. This enables the sixth arm body C6 to be moved in the lateral direction Y in a state where the posture of the sixth arm body C6 is maintained, and the distance in the longitudinal direction Z between the sixth arm body C6 and the base 21 is short.

Figure 2:
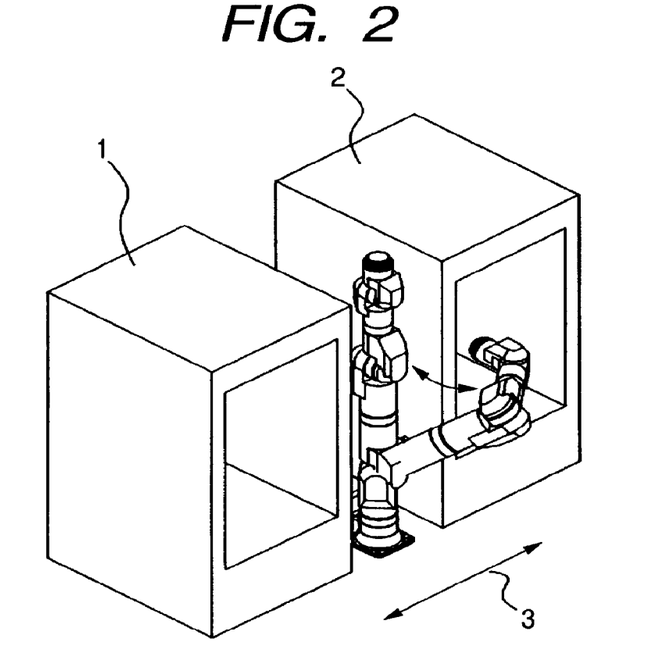
FIG. 2 is a perspective view showing the operation of the manipulator according to an embodiment of the invention.

Further, in a case where the articulated manipulator of the invention is used for handling of a workpiece between processing machines, as shown in FIG. 2, the manipulator can be disposed in a dead space between a processing machine 1 and a processing machine 2. Since the front face of a processing machine is secured as a space 3 by which a worker passes in a case where the manipulator is not operated, a new space is not required in installing the manipulator. This posture is an installation state equivalent to a case where an obstruction exists between the angles formed by the joint axis J5 of the fifth arm body C5, and the joint axis J3 of the third arm body C3, in the posture shown in FIG. 3.

What is claimed as new and is desired to be secured by Letters Patent of the United States is:

1. An articulated manipulator comprising:
   a base body to be mounted on an installation surface where the articulated manipulator is installed;
   a first arm body having a first end portion, a second end portion opposite to the first end portion, and a first rotation axis that is parallel to a longitudinal axis of the first arm body;
   a first joint part connecting the base body and the first end portion of the first arm body rotatably around the first rotation axis;
   a second arm body having a third end portion, a fourth end portion opposite to the third end portion, and a second arm center axis;
   a second joint part connecting the second end portion of the first arm body and the third end portion of the second arm body rotatably around a second rotation axis that is substantially perpendicular to the first rotation axis, the second end portion of the first arm body being connected to one side of the second joint part, the third end portion of the second arm body being connected to another side of the second joint part opposite to the one side;
   a third arm body having a fifth end portion, a sixth end portion opposite to the fifth end portion, and a third rotation axis; and
   a third joint part connecting the fourth end portion of the second arm body and the fifth end portion of the third arm body rotatably around the third rotation axis that is substantially perpendicular to the second rotation axis and that is aligned with the second arm center axis,
   wherein when the first, second and third arm bodies are all erected with respect to the installation surface, the first rotation axis, the second arm center axis, and the third rotation axis are substantially aligned with each other.

2. The articulated manipulator according to claim 1, wherein the first, second and third joint parts comprise actuators, respectively, to rotate the first, second and third arm bodies, each of the actuators comprising:
   a servo motor; and
   a reducer connected to the servo motor such that a rotation axis of the servo motor and a rotation axis of the reducer are on a common rotation axis.

3. The articulated manipulator according to claim 2, wherein the actuators are so constructed that the servo motor and the reducer are integrally formed.

4. The articulated manipulator according to claim 2, wherein a through hole is formed around the common rotation axis in each of the actuators.

5. The articulated manipulator according to claim 4, wherein a line body is inserted into the through hole and is disposed so as to sequentially pass through the first, second and third arm bodies and the first, second and third joint parts.

6. The articulated manipulator according to claim 5, wherein the line body comprises a power line and a signal line for the servo motor.

7. The articulated manipulator according to claim 5, wherein the line body comprises a power line, a signal line, and a fluid tube of an end effector connected at a tip of the plurality of arm bodies.

8. The articulated manipulator according to claim 5, wherein the line body comprises
   a plurality of linear body parts, and
   connectors to connect the plurality of linear body parts.

9. The articulated manipulator according to claim 5, wherein the plurality of linear body parts are connected via the connectors in a vicinity of the through hole.

10. The articulated manipulator according to claim 5,
    wherein, in the through hole of the actuator in the second joint part, the line body is inserted into the through hole to pass through the through hole and is bent at both ends of the through hole, and
    wherein the line body is fixed by clamp members such that protruding distances of the bent portions from the through hole are substantially same.

11. The articulated manipulator according to claim 10, wherein each of the first, second and third arm bodies is configured such that its lower portion is connected to each of the actuators that drives an adjacent rotation axis of the adjacent joint parts, its internal space meanders so as to be away from the adjacent rotation axis and receives the bent portions, and its upper portion holds an actuator that drives a next rotation axis of the adjacent joint parts.

12. The articulated manipulator according to claim 10,
    wherein each of the plurality of arm bodies is constructed so as to be divided into a rigid-body portion that receives the joint part, and a cover portion that receives the bent portions, and
    wherein the cover portion is formed of a resin material that is lighter than material of the rigid-body portion.

13. The articulated manipulator according to claim 1,
    wherein the second joint part including a through hole provided along the second rotation axis, and said articulated manipulator further comprises:
a line body extending through the through hole of the second joint part from an inside of the first arm body to an inside of the second arm body, the line body comprising:
a first linear body part provided inside the first arm body to extend along the first rotation axis;
a second linear body part extending through the through hole of the second joint part;
a third body part connecting the first linear body part to the second linear body part and bent to protrude at a first distance from the first rotation axis;
a fourth linear body part provided inside the second arm body to extend along the second arm center axis; and
a fifth body part connecting the second linear body part to the fourth linear body part and bent to protrude at a second distance from the first rotation axis, the second distance being substantially same as the first distance.

* * * * *